(No Model.)
C. A. PAUL.
PULLEY.
No. 466,949. Patented Jan. 12, 1892.
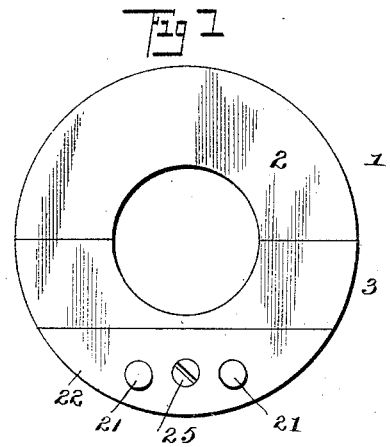
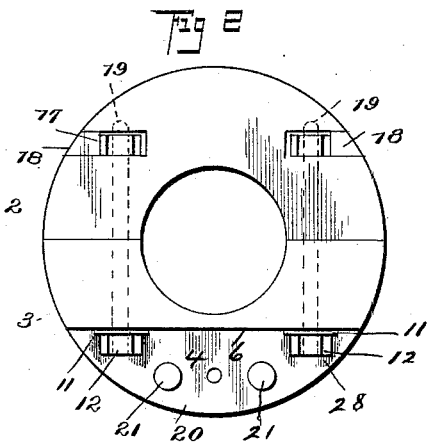
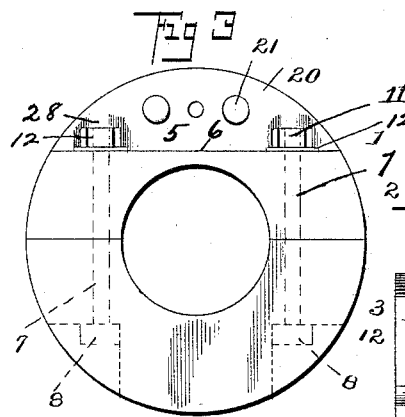
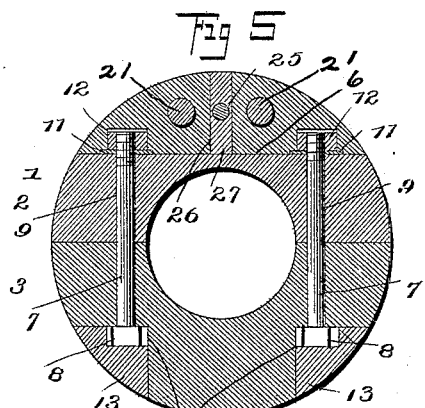
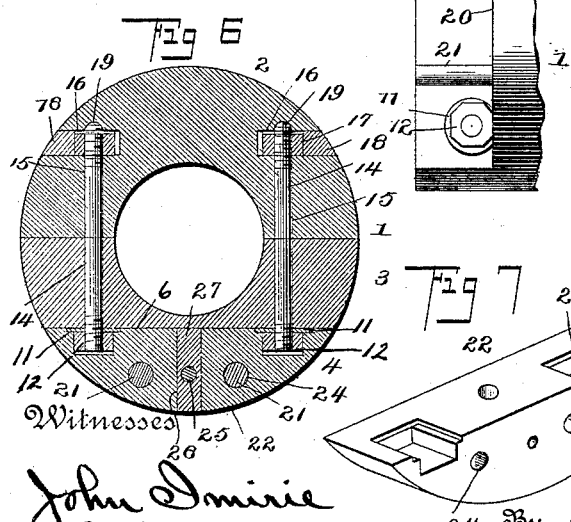
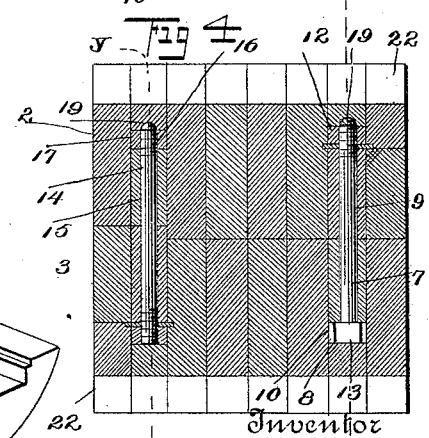
Witnesses
John Imirie
B. Weile
Inventor
Charles A. Paul
By his Attorney
Franck D. Johns

UNITED STATES PATENT OFFICE.

CHARLES A. PAUL, OF FORT WAYNE, INDIANA.

PULLEY.

SPECIFICATION forming part of Letters Patent No. 466,949, dated January 12, 1892.

Application filed July 28, 1891. Serial No. 400,983. (No model.)

*To all whom it may concern:*

Be it known that I, CHARLES A. PAUL, a citizen of the United States, residing at Fort Wayne, in the county of Allen and State of Indiana, have invented certain new and useful Improvements in Pulleys; and I do hereby declare the following to be a full, clear, and exact description of the invention, such as will enable others skilled in the art to which it appertains to make and use the same.

My invention relates to certain new and useful improvements in split pulleys; and it consists in the novel construction and arrangement of parts hereinafter fully described, and afterward definitely pointed out in the claims, due reference being had to the accompanying drawings, forming a part of this specification, wherein—

Figure 1 is an elevation of one end of the pulley; Fig. 2, an end view with parts removed; Fig. 3, an end view opposite to that shown in Fig. 2 with parts removed. Fig. 4 is a longitudinal section of the pulley; Fig. 5, a section taken on line $x$ $x$ of Fig. 4; Fig. 6, a cross-section taken on line $y$ $y$ of Fig. 4; Fig. 7, a detail in perspective of one of the caps, and Fig. 8 a face view of the pulley partially broken away and having one of the caps removed.

Referring to said drawings, the numeral 1 indicates the pulley proper, formed in two halves or segments 2 and 3 and adapted to be secured about a shaft or removed therefrom without disturbing the shaft. The segments 2 and 3, composing the pulley, are cut away or segmentally recessed, as at 4 and 5, forming shoulders 6, against which the nuts of the fastening-bolts bear, as will hereinafter appear. I have shown two methods of fastening the bolts in the pulley. In one case I employ bolts 7, provided with heads 8. Said bolts are passed through bolt-holes 9, formed in the ends of the segments 2 and 3, the segments being recessed in their diagonal opposite ends, as at 10, to receive the heads 8 of the bolts and prevent said bolts from turning, the other ends of the bolts being threaded and projecting beyond the shoulders 6, formed on the segments. Washers 11 are slipped over the ends of said bolts, and nuts 12 are screwed thereon, drawing the segments 2 and 3 closely together. Plugs 13 are secured in place in the recesses 10 and cover the heads of the bolts. In the second case bolts 14, having both their ends threaded, are inserted in bolt-holes 15, formed in the ends of the segments 2 and 3. Said segments near their diagonally-opposite ends are recessed, as at 16, and within said recesses are slipped nuts 17, which are secured in place by plugs 18. The ends of the bolts 14 are screwed into the nuts 17, the recesses 16 being countersunk, as at 19, to permit the bolts to pass entirely through the nuts, and the other ends of said bolts project beyond the shoulders 6 and are provided with washers 11 and nuts 12, as before described. In practice all the bolts in the pulley may be alike and of either of the above-described forms, or I may employ both forms in the same pulley, as shown in the drawings. In cutting away the segmental recesses 4 and 5 shoulders 20 are formed, in which are secured two tenons 21, which project at right angles to the said shoulders and parallel with the shoulders 6.

22 indicates a removable cap, there being one at each diagonally-opposite end of the pulley, provided with two recesses 23, adapted to rest over the washers 11 and nuts 12 on one end of the bolts 7 and 14 and having orifices or sockets 24, through which the tenons 21 pass when the cap is in place. Said cap is finally secured in position by means of a screw 25, which passes through the end of said cap into the body of the pulley, said screw and tenons firmly securing said cap in position against accidental displacement. I prefer to perforate the cap 22, as at 26, and insert a wooden pin 27, through which the screw 25 passes. This prevents danger of the cap being split by the screw when the latter is inserted and affords a firm hold for said screw. The caps 22 are segmental-shaped, as shown, and fit the cut-away ends of the pulley. The shoulders 20 are slightly recessed, as at 28, to permit the washers 11 and nuts 12 to be easily applied to the bolts 7 or 14.

As above constructed, the two segments 2 and 3 are clamped about the mandrel of a lathe and the rim of the pulley turned true, after which it is removed and is then adapted to be applied to a shaft without disturbing said shaft or its bearings.

Having thus described my invention, what I claim is—

1. In a pulley, the combination of the segments 2 and 3, having their diagonally-opposite ends segmentally cut away, as at 4 and 5, forming shoulders 6 and provided with recesses in the diagonally-opposite solid ends of the pulley, bolt-holes formed in the ends of the segments, suitable bolts secured in the bolt-holes and uniting the segments and projecting at one end into the cut-away portions of the pulley and at their opposite ends into the recesses, tenons secured in the cut-away portions, segmental caps fitting over said tenons and covering one end of the bolts, screws passing through each cap and engaging the body of the pulley, and plugs fitting within the recesses and covering the opposite ends of the bolts, substantially as shown and described.

2. In a split pulley, the combination of the two segments 2 and 3, having their diagonally-opposite ends cut away, as shown, and recesses 16 in the diagonally-opposite solid ends of the segments, nuts 17, resting in said recesses, the bolts 14, threaded at both ends and passing through bolt-holes 15 in the ends of the said segments and engaging the nuts 17, the washers 11 and nuts 12, engaging the other ends of said bolts, and detachable segment-shaped caps covering the nuts and ends of said bolts, substantially as described.

In testimony whereof I affix my signature in presence of two witnesses.

CHARLES A. PAUL.

Witnesses:
F. W. KUHNE,
PAUL F. KUHNE.